Figure 1:
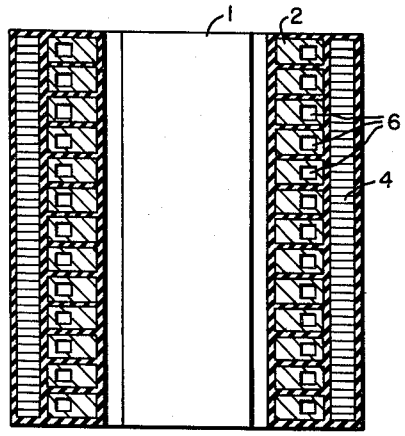

Oct. 16, 1962     H. HERSCHMANN     3,059,083

INDUCTION HEATING APPARATUS

Filed Nov. 18, 1959

WITNESSES:
Bernard R. Gieguey
James F. Young

INVENTOR
Heinrich Herschmann
BY
D. J. Stroudiff
AGENT

United States Patent Office 3,059,083
Patented Oct. 16, 1962

3,059,083
INDUCTION HEATING APPARATUS
Heinrich Herschmann, Berlin-Spandau, Germany, assignor to Siemens-Schuckertwerke Aktiengesellschaft, Erlangen, Germany, a corporation of Germany
Filed Nov. 18, 1959, Ser. No. 853,948
Claims priority, application Germany Nov. 27, 1958
1 Claim. (Cl. 219—10.75)

With apparatus for inductively heating (induction furnaces) metal blocks, very high current densities occur in the induction coils which, in turn, result in high losses. The cross sectional area of winding of the induction coil enveloping the work to be heated is determined in the axial direction by the height of the coil and by the number of turns. The width of the individual turns is optional at first. However, since, due to the limited depth of penetration, the current will not be distributed throughout the entire width of the turns, it would be impractical to choose a width exceeding a certain measure. Therefore, if $\delta$ represents the depth of penetration, a turn width in the order of $2\delta$ will suffice. A further increase of the cross-sectional area will not result in any additional decrease of the resistance. The winding conductors would then have to be divided into individual partial conductors, and the individual partial conductors would have to be insulated from each other and crossed. This, however, would complicate the production since the winding conductors must be of the hollow type in order to permit removal of the high current heat losses by means such as water cooling.

In eliminating these disadvantages, the invention uses a different approach. In accordance with the invention, the operating winding enveloping the work to be heated is surrounded by a compensation winding connected to a source of reactive current.

Preferably, such sources of reactive current are capacitors. Accordingly, the induction coil surrounding the work comprises two concentrically arranged cylindrical coils insulated from each other, one of said coils representing the operating winding connected to the main supply, and the other of said coils representing the compensation winding connected to a source of reactive current supplying part of the magnetizing current. In this manner, the operating winding is relieved by an amount corresponding to the reactive current flowing through the compensation winding so that the total current is distributed over a larger cross-sectional area of winding. As compared to induction furnaces of known type, the power loss is substantially decreased for a given amount of useful power transmitted. The use of capacitors connected in the circuit of the compensating winding according to the invention involves no additional cost, since these capacitors would otherwise be required in the primary circuit of the operating winding for compensating the reactive power.

Other objects and advantages of the invention will become apparent from the following specification and claim.

Figure 2:
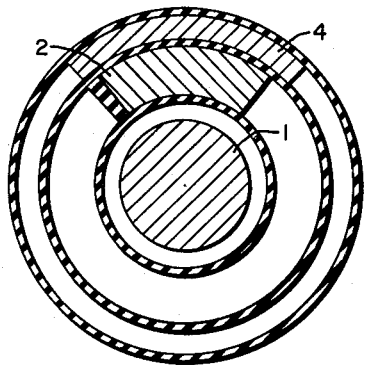
Figure 3:
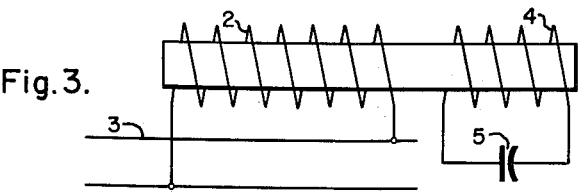

A preferred embodiment of the invention will now be described with reference to FIGS. 1 to 3 of the accompanying drawing. FIGS. 1 and 2 are schematic views of an induction furnace embodying the teachings of the invention, and FIG. 3 shows the circuit diagram of said induction furnace. It will be seen from the drawings that the workpiece 1 is surrounded by the operating winding 2 supplied from the supply line 3. Arranged concentrically with the operating winding 2 is the compensating winding 4 which is connected to the capacitor means 5. The operating winding 2 and the compensating winding 4 are insulated from each other.

For the purpose of removing heat, the operating winding 2 is provided with cooling ducts 6 in a manner known per se. The cooling ducts 6 are disposed within the operating winding 2 in the end portions of the turns thereof facing the compensating winding 4.

I claim:
An induction heating apparatus comprising an operating winding for surrounding a workpiece to be heated, a compensating winding mounted on and encircling said operating winding and connected to a source of reactive current, said operating winding having turns of insulated conductor in direct contact with each other and having cooling ducts in the outer portion adjacent to said compensating winding, in which apparatus the current burden of said operating winding is relieved by an amount corresponding to said reactive current, thereby distributing the heating current load over a larger cross-sectional area of winding.

References Cited in the file of this patent
UNITED STATES PATENTS

| 2,090,692 | Melton | Aug. 24, 1932 |
| 2,430,640 | Johnson | Nov. 11, 1947 |
| 2,747,068 | Lackner | May 22, 1956 |